March 13, 1956 T. I. LESTON ET AL 2,738,053
ROD FEEDING APPARATUS
Filed May 26, 1953 3 Sheets-Sheet 1
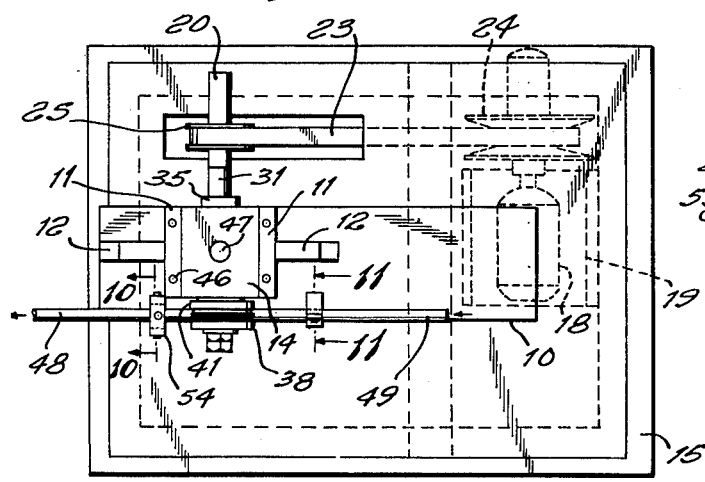
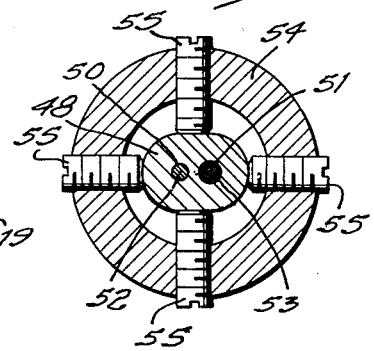
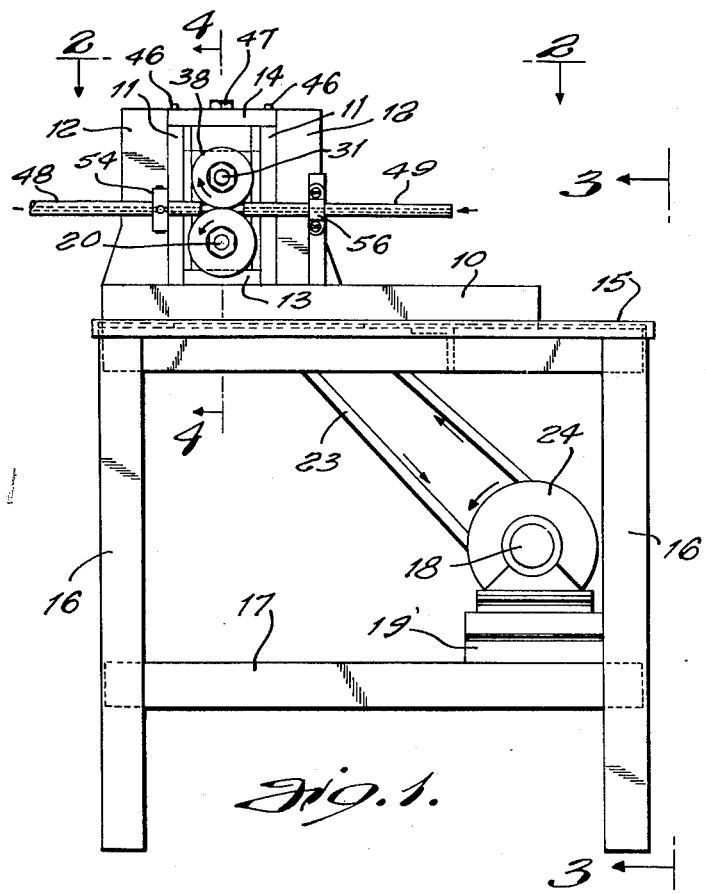
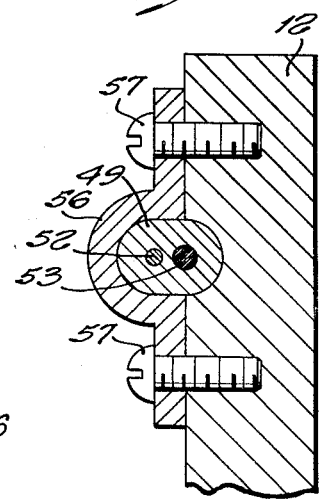
INVENTORS
THEODORE I. LESTON,
WILLIAM B. KRIEWALL
BY
ATTORNEY

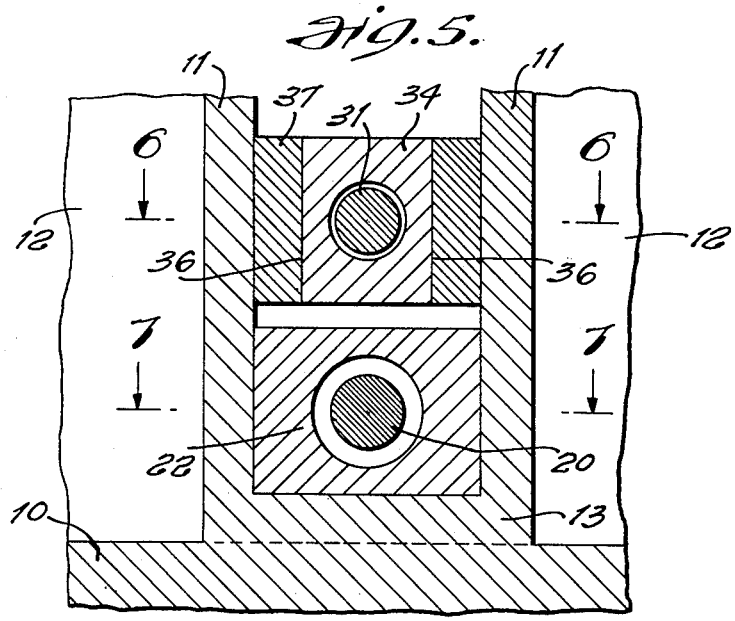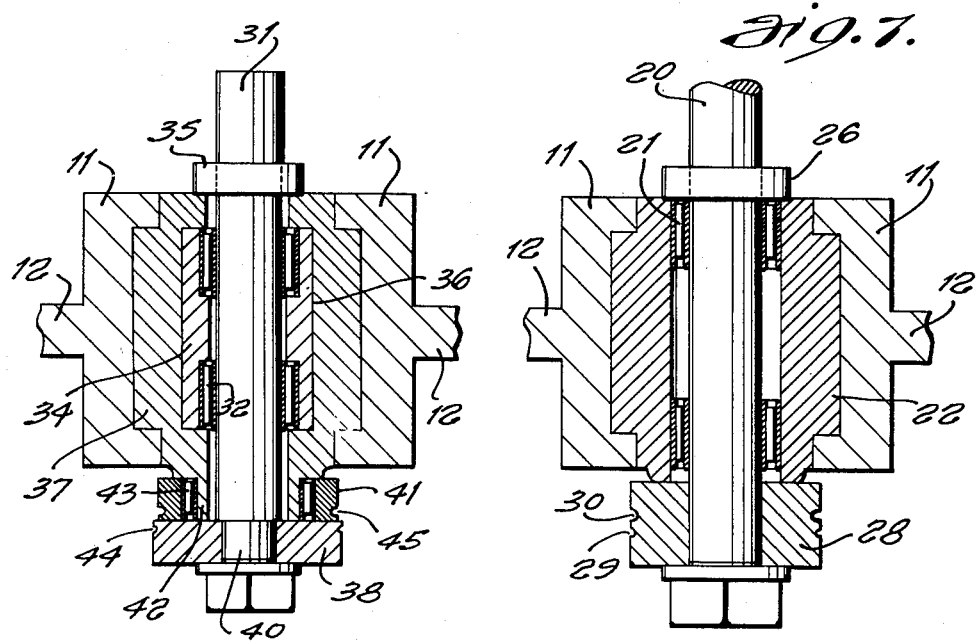

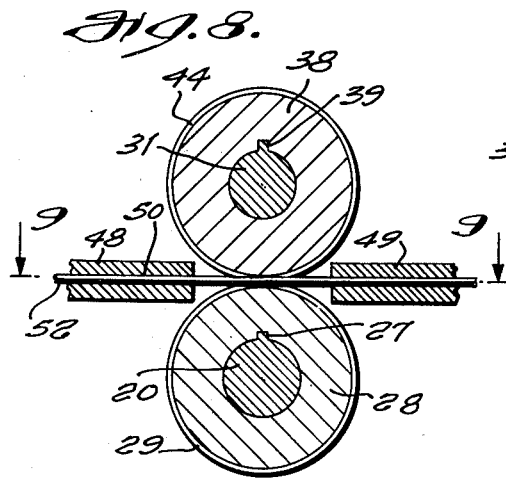
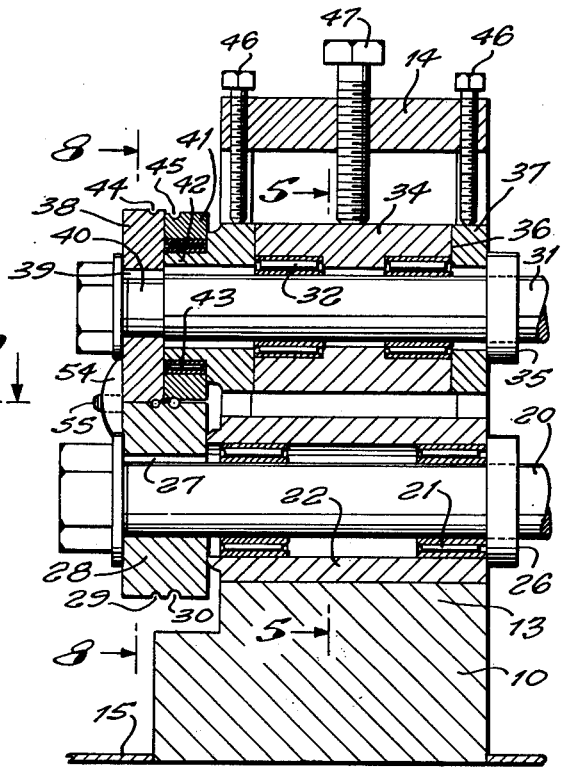
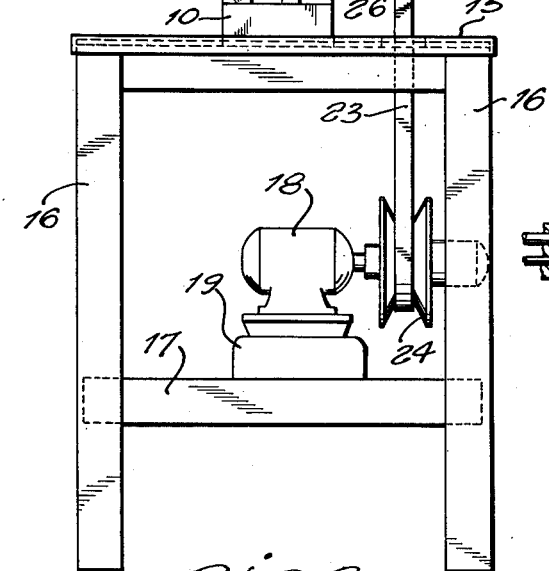
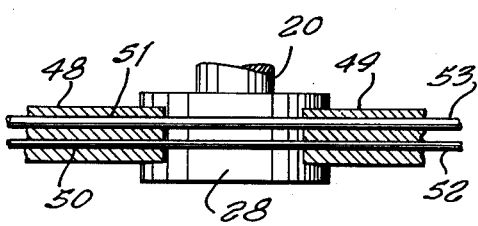

United States Patent Office 2,738,053
Patented Mar. 13, 1956

2,738,053

ROD FEEDING APPARATUS

Theodore I. Leston, New York, and William B. Kriewall, Flushing, N. Y., assignors to Eutectic Welding Alloys Corporation, Flushing, N. Y., a corporation of New York Application May 26, 1953, Serial No. 357,414

3 Claims. (Cl. 203—230)

This invention relates to rod feeding apparatus, and more particularly to apparatus for feeding metal welding rods into an extrusion press where they are coated with flux, although the apparatus may be used for other rod feeding purposes.

An object of the invention is to provide apparatus for feeding a plurality of rods simultaneously and at the same rate of speed.

Another object of the invention is to provide apparatus for so feeding two or more rods of different diameters.

A further object of the invention is to provide feeding means that will exert uniform pressure on all of the rods that are being fed.

The problem of feeding a plurality of rods simultaneously at the same rate of speed and with exertion thereon of uniform pressure is one that has presented considerable—some believed, insurmountable—difficulties. This is due to the fact, and particularly in the case of feeding rods of different diameters, that one may slip while another feeds, or vice versa. Another factor is that the metal rods may vary somewhat in diameter throughout their lengths since a tolerance of + or −.003" is permitted in manufacture, and accepted in commercial practice.

The invention is illustrated in the accompanying drawings, forming a part of this specification, in which:

Fig. 1 is a side view of the rod feeder;

Fig. 2 is a top plan view thereof;

Fig. 3 is an end elevation of the same;

Fig. 4 is a vertical section, on an enlarged scale, taken on the line 4—4 of Fig. 1;

Fig. 5 is a vertical section of part of the apparatus on the line 5—5 of Fig. 4;

Fig. 6 is a horizontal section on the line 6—6 of Fig. 5;

Fig. 7 is a similar horizontal section on the line 7—7 of Fig. 5;

Fig. 8 is a vertical section through the feed roll and one of the idler rolls, also showing in section a fragment of the rod guideway, taken on the line 8—8 of Fig. 4;

Fig. 9 is a horizontal section of the rod guideway, taken on the line 9—9 of Fig. 8 as viewed in the direction of the arrows;

Fig. 10 is a detailed transverse section on the line 10—10 of Fig. 2; and,

Fig. 11 is a similar section on the line 11—11 of Fig. 2.

The framework of the feeding apparatus in general comprises a bed or foundation 10, and a pair of parallel uprights 11—11 extending across the bed, each of which has a vertical rib or flange 12. The bed 10 has a portion 13 that projects upward in the space between the lower ends of the uprights. A top or bearing plate 14 is supported on and secured to the upper ends of the uprights, between the flanges 12. In the form of apparatus shown this framework is mounted upon a table frame having a top 15, legs 16, and braces or struts 17. An electric motor 18 is supported on a bracket 19 which motor supplies the driving power of the feeding apparatus although, of course, any other suitable driving means or power drive may be employed. A drive shaft 20 is supported on roller bearings 21 in a housing 22 that extends transversely between the uprights 11—11. The drive shaft may be driven by the motor through the belt 23 and pulleys 24—25, and has a collar bearing 26 to prevent end-thrust. If desired, a suitable friction clutch may be provided to control the drive. Keyed at 27 to the drive shaft, to rotate therewith, is a feed roller 28, which roller has peripheral grooves 29 and 30 to receive the rods to be fed. In the present instance the apparatus is designed to feed simultaneously two rods of different diameters.

An idler shaft 31 is supported on roller bearings 32 to rotate in a bearing block 34, the shaft having a collar bearing 35. The bearing block 34 fits into the vertical opening 36 in the bearing block housing 37. On referring to Fig. 4 it will be seen that there is clearance between the housing member 37 and the idler shaft 31.

An outer roller 38 is keyed at 39 to an end portion 40 of the idler shaft 31, which end portion is of reduced diameter. An inner roller 41 is mounted on the cylindrical end portion 42 of the housing member 37 to turn freely on the roller bearings 43. The outer idler roller 38 has a peripheral groove 44 that mates with the groove 29 of feed roller 28, while the inner idler roller 41 has a similar groove 45 that mates with the groove 30 of said feed roller.

A pair of set screws 46 pass through openings in the top plate with their ends bearing on the ends of the housing member 37, while a central set screw 47, also passing through the plate 14, bears against the bearing block 34, as best seen in Fig. 4. By means of these set screws the idler rollers 38 and 41 may be respectively adjusted to effect uniform pressure on the two rods that are to be fed, so as to assure that the rods will feed simultaneously at a constant rate of motion and without slippage of either of them. The construction and arrangement of the idler shaft, its bearing block, and housing is such as to provide an adjustable floating support for the idler rollers.

Guideways 48 and 49 are provided to conduct the rods to and from the feeder in perfect parallelism. The guideways have passages 50 and 51 through which the rods 52 and 53 travel.

The guideway 48 is mounted on the framework in a supporting sleeve or collar 54 which has a plurality of set screws 55 whereby its position may be adjusted, as best seen in Fig. 10. The companion guideway 49, as shown in Fig. 11, is held in a support 56 that is secured by screw bolts 57 to the framework.

In operation, the rods travel in parallelism inward to the driven feed roller 28 through the guideway 49 and outward from said roller through the guideway 48, although the direction of feed of the rods and rotation of the feed roller may be reversed if desired. The idler rollers 38 and 41 rotate with the driven roller by direct or indirect contact therewith. Rotation of the feed roller causes the rods to progress between said roller and the idlers in the peripheral grooves of the rollers. By adjusting the idler rollers, the pressure upon the rods as they pass over the feed roller may be easily adjusted so that the rods will feed simultaneously, without slippage, at the same rate of speed which will remain constant throughout the feeding operation. In the case of rods of different lengths, the longer rod or rods will automatically continue to feed after the shorter rod or rods have been fed as long as the feeding apparatus continues to operate and rods are fed into it.

Various modifications in detail of the elements of the apparatus herein illustrated and described may be made within the scope of the invention.

What we claim is:

1. Apparatus for feeding a plurality of rods simultaneously at a constant rate of speed, comprising a drive shaft, a feed roller keyed to the drive shaft, means for driving the shaft, an idler shaft, a bearing block rotatably supporting the idler shaft, a housing for the bearing block, an idler roller keyed to the idler shaft, a second idler roller supported to turn freely on a portion of the housing, said rollers being disposed side by side to revolve concentrically about the axis of the idler shaft and to bear upon the rods passing under the idler rollers and over the feed roller, and means for independently regulating the pressure of each idler roller.

2. Apparatus for feeding a plurality of rods simultaneously at a constant rate of speed, comprising a drive shaft, a feed roller keyed to the drive shaft, means for driving the shaft, an idler shaft, a bearing block rotatably supporting the idler shaft, a housing for the bearing block having a vertical opening in which the bearing block is held, there being clearance between the housing and the idler shaft, an idler roller keyed to the idler shaft, a second idler roller supported to turn freely on a portion of the housing and disposed adjacent to the first idler roller, said idler rollers being adapted to bear upon the rods passing over the feed roller and under the idler rollers, and means for regulating the pressure of the idler rollers including an adjustable screw bearing on the block that supports the idler shaft and a pair of adjustable screws bearing on portions of the housing at each side of its vertical opening.

3. Apparatus for feeding a plurality of rods simultaneously at a constant rate of speed, comprising a drive shaft, a feed roller keyed to the drive shaft, means for driving the shaft, an idler shaft, a bearing block rotatably supporting the idler shaft, a housing for the bearing block having a vertical opening in which the bearing block is held for vertical adjustment, an idler roller keyed to the idler shaft, a second idler roller supported to turn freely on a cylindrical end portion of the housing and disposed adjacent to the first idler roller, said idler rollers being adapted to bear upon the rods passing between the feed roller and the idler rollers, means for regulating the pressure of the idler rollers including an adjustable screw bearing on the block that supports the idler shaft and a pair of adjustable screws bearing on portions of the housing at each side of its vertical opening, said bearing block being adjustable independently of adjustment of the housing.

References Cited in the file of this patent

UNITED STATES PATENTS

| | | |
|---|---|---|
| 296,551 | Frost et al. | Apr. 8, 1884 |
| 335,889 | Briggs | Feb. 9, 1886 |
| 670,928 | Davison | Apr. 2, 1901 |